Oct. 26, 1954
O. J. POUPITCH
2,692,414
SNAP-IN STUD FASTENER
Filed May 8, 1952
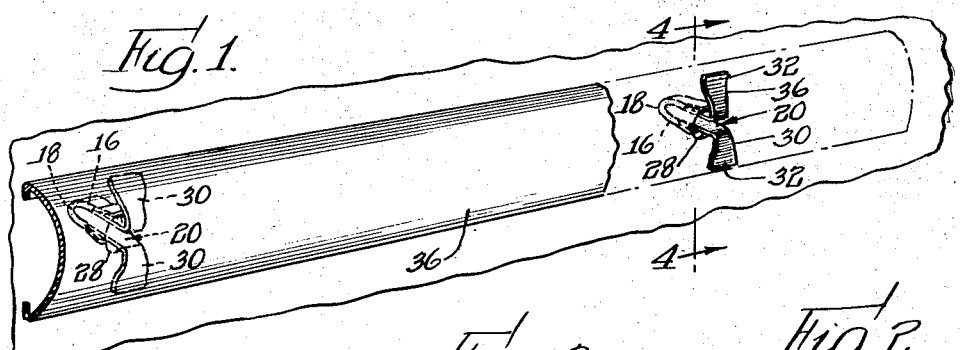
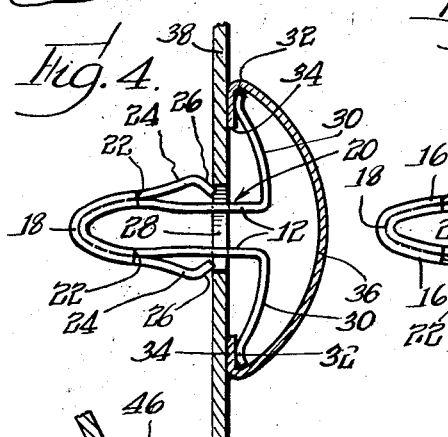
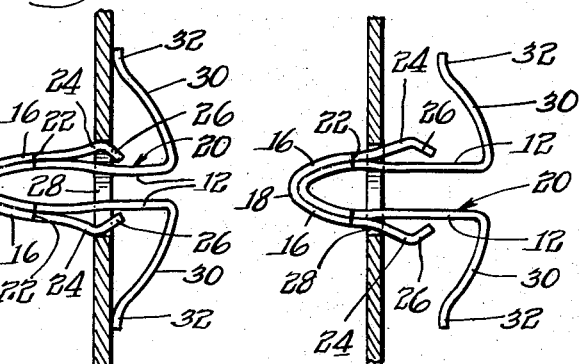
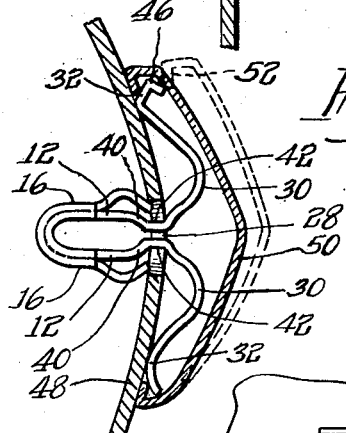
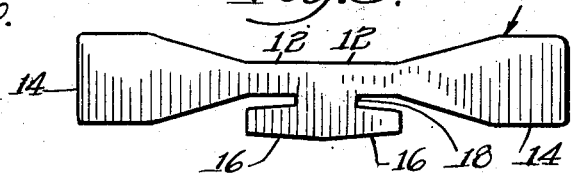
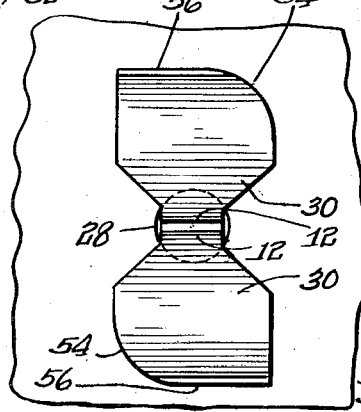
INVENTOR.
Ougljesa Jules Poupitch
By:- Moore, Olstad & Trexler
attys.

Patented Oct. 26, 1954

2,692,414

UNITED STATES PATENT OFFICE 2,692,414

SNAP-IN STUD FASTENER

Ougljesa Jules Poupitch, Chicago, Ill., assignor to Illinois Tool Works, Chicago, Ill., a corporation of Illinois Application May 8, 1952, Serial No. 286,749

4 Claims. (Cl. 24—73)

The present invention relates to snap fasteners, and more particularly to snap fasteners adapted to removably secure articles, such as a molding strip or other apertured parts, to a work piece.

An object of the present invention is to provide a novel and simple one-piece snap fastener of the type having a U-shaped stud section and a flexible article engaging head section, with work piece engaging wings attached to the stud section in a novel manner, so that the wings and the head section may be flexed independently of each other, whereby either the stud section or the head section may be assembled respectively with a work piece or an article as either the first or second step without disturbing the relationship between the parts first assembled.

Another object of this invention is to provide a novel one piece sheet material snap fastener of the above described type, wherein the flexible work piece engaging wings and the molding or article engaging head section are disposed so that the article is clamped to the work piece with a maximum of efficiency.

Still another object is to provide a novel flat blank of sheet material, preferably metal, from which the above described novel snap fastener can be easily and inexpensively manufactured by simple bending or folding operations.

Other objects of the present invention will be apparent from the following description and the drawings, wherein:

Fig. 1 is a perspective view, showing a molding fastened to a work piece by my improved snap fastener;

Figs. 2 and 3 are side views partially sectioned showing my novel snap fastener at intermediate stages of assembly with a work piece;

Fig. 4 is a partial cross section taken through line 4—4 of Fig. 1;

Fig. 5 is a plan view, showing a metal blank from which my improved snap fastener is formed;

Fig. 6 is a partial cross section similar to Fig. 4, showing a modified form of my invention;

Fig. 7 is a plan view, showing another modified form of my invention; and

Fig. 8 is a partial vertical cross section, showing still another modified form of my improved snap fastener.

Referring now more specifically to the drawings, wherein like parts are designated by the same numeral throughout the figures, my improved snap fastener is preferably formed from a sheet metal blank 10, shown in Fig. 5, which has shank or stud portions 12—12, molding or article engaging arm portions 14—14, and work piece engaging wing portions 16—16, which are connected adjacent their inner ends to the inner ends of the stud or shank portions 12—12 by a connecting portion 18.

In the embodiment shown in Figs. 1 through 4, the stud or shank portions 12—12 are formed into a substantially U-shaped stud 20. The wing portions 16—16 are folded or bent so that they lie flush along the outer surfaces of the opposite sides of the stud 20. The connecting portion 18 preferably extends laterally from the marginal edges of stud portions 12—12 just enough to allow the wings to be folded flat against the sides of the stud 20. As shown best in Figs. 2, 3, and 4, the connecting portion 18 preferably has a sufficient length so that it extends up the sides of the stud 20 to points 22—22. The connecting portion 18 thus takes the form of an integral flange extending normally from both the U-shaped stud and the wing portions 16—16, which not only connects these parts, but also serves to make the lower or closed end portion of the U-shaped stud and the lower portion of the wings relatively rigid. Adjacent their upper ends and above the points 22—22, the wings 16—16 have outwardly flared cam portions 24—24 which terminate in inwardly bent work pieces engaging end portions 26—26. As shown in Fig. 4, the work piece engaging portions are preferably long enough to extend past the edges of the opening 28 in the work piece 13. Thus, when it is desired to remove the snap fastener from the work piece, the inturned portions 26 act as cams or cam surfaces to force the wings 16—16 inwardly so that the stud or shank 20 may pass outwardly through the opening 28.

The head section of the fastener is composed of molding or article engaging arms 30—30 extending outwardly in opposite directions from the upper or free ends of the U-shaped stud 20. The arms 30—30 are preferably slightly curved and directed downwardly to increase their resilient clamping action. The arms 30—30 terminate adjacent their outer ends in upwardly curved end portions 32—32 which are adapted to engage or to clamp an article or molding to the work piece. In Fig. 4, the curved portions 32—32 are shown clamping the inturned flanges 34 of the channel molding 36 against the work piece 38.

In assembling the device shown in Figs. 1 through 4, the arms 30—30 may either be inserted through the open end of the molding 36, or they may be sprung together and snapped into the molding. To spring the arms 30—30 together, it is merely necessary to urge the opposed side portions 12—12 of the U-shaped stud 20 together. It should be noted that only the upper portions of the sides 12—12 will usually be flexed since the lower portions thereof are made relatively rigid by the connecting portion 18. Thus, wings 16—16 remain unaffected by this flexing of the sides 12—12 since the wings are connected to the sides only along the relatively rigid lower portions. Upon release of the sides 12—12, they will spring back to normal position, as shown in Figs. 2 and 4. The stud or shank 20 is then inserted through the opening 28, and while passing through the opening, the sides of the opening engage the cam portions 24—24, and bend the wings inwardly to allow the stud 20 to pass therethrough, as shown in Figs. 2 and 3. It should also be noted that during this step only the portions of the wings above the points 22—22 will flex so that the sides 12—12 of the U-shaped stud are unaffected. Upon the stud or shank being fully inserted, the wings 16—16 spring outwardly to their normal position, and the work piece engaging portion 26—26 of the wings resiliently engages the lower edges of the opening 28, thus resiliently and firmly clamping the flanges 34 of the channel molding 38 to the work piece. It should be noted that the wings 16—16 and the arms 30—30 extend in the same directions from opposite sides of the U-shaped shank or stud 20. By this arrangement, the points of engagement or clamping action of the arms and the wings are in alignment with one another and oppositely disposed. By this structure, a maximum of clamping action is obtained.

It is a feature of my invention that the inwardly springing or flexing action of either the arms 30—30 or the wings 16—16 may be carried out independently of the other, while the fastener is constructed so that the wings 16—16 and the arms 30—30 extend from the stud or shank 20 in the same directions. This independent flexing action is a result of my novel structure which integrally joins the wings 16—16 to the edge of the U-shaped shank 20 adjacent its lower or closed end. Because of this independent flexing action, it is readily seen that the arms 30—30 may be assembled with the molding 36, and the wings 16—16 may be flexed inwardly to enable the stud 20 to be inserted through the opening 28 without flexing the arms 30—30 inwardly and causing the molding to become disassembled. If it is desired to insert the stud 20 in the work piece first, it is clear that this independent flexing action will allow the subsequent assembly of the molding without danger of the fastener coming loose from the work piece.

Fig. 6 shows a modified form of my improved snap fastener. In this embodiment, the upper ends of the sides 12—12 of the U-shaped stud or shank 20 are bent inwardly as at 40. Stop portions 42—42, which are relatively close together, extend upwardly from the inwardly bent portions 44—44. These stop portions limit the amount the molding engaging arms 30—30 can be moved together. In this embodiment, the molding engaging arms are curved upwardly and then downwardly to increase the resiliency thereof. One of the upwardly curved ends 32 of the arms 30 terminates in an upwardly and rearwardly extending flange 46. As shown in Fig. 6, one inturned flange 48 of the channel molding 50 may be positioned under the curved portion 32 of the arm 30. The channel molding 50 is then pressed downward, and, as shown in dotted lines, the inturned flange 52 thereof will slide down the outer surface of the flange 46, which guides the molding under the upwardly curved portion 32 to its locked position shown in solid lines. This pressing action will also cause the side portions 12—12 of the shank or stud 20 to be sprung together, thus enabling the molding to be easily assembled with the fastener. In this embodiment, the work piece engaging wings 16—16 are identical to that shown in Figs. 1 through 4.

Fig. 7 shows a modified form of either the snap fastener shown in Figs. 1 through 5 or in Fig. 6, wherein the molding engaging arms 30—30 are provided with curved cam edges 54 and the straight locking edges 56. This structure enables the fastener to be inserted endwise into an open end of a molding and then twisted so that the arms extend perpendicular to the longitudinal axis of the molding. The cam surfaces 54—54 allow this twisting action to take place, and the locking edges 56—56 bear against opposite sides of the channel and hold the fastener in position.

Fig. 8 shows still another modified form of my improved snap fastener, wherein the arms 30—30 terminate in relatively long flat portions 58. This form of the invention is especially useful in clamping an article such as a flat plate 60 to the work piece 38. The U-shaped stud 20 and the work piece engaging wings 16—16 of this embodiment of the invention are formed in the same manner as the similar parts of the fastener shown in Figs. 1 to 4, inclusive.

From the above description, it is clear that the present invention provides a novel snap fastener in which the article engaging arms of the head section and the work piece engaging wings may be flexed independently of each other. Moreover, the simple structure of this novel snap fastener makes it particularly adapted to be manufactured quickly and inexpensively from a flat blank of sheet material by using only simple folding or bending operations.

Having thus described and shown the preferred embodiment of my invention, I claim:

1. A one piece sheet metal snap fastener for securing articles to an apertured work piece, comprising a substantially U-shaped resilient stud portion with the opposed legs of the U-shaped stud portion normally being spaced apart at the open end of the U, said U-shaped stud portion having opposed legs with relatively broad rectangular cross sections, article engaging head sections extending from the free ends of said U-shaped stud portion, and a pair of oppositely disposed work piece engaging wings extending along and overlying the opposite sides of said U-shaped stud portion, each of said wings including portions of relatively broad rectangular cross section with the broad sides of said rectangular wing portions disposed substantially parallel to the broad sides of the legs of the U-shaped stud portion, each of said wings being integrally connected along marginal portions thereof with marginal portions of said U-shaped stud portion adjacent its closed end, and said wings having adjacent their free ends outwardly flared work piece engaging portions.

2. A one piece sheet metal snap fastener for securing articles to an apertured work piece, comprising a substantially U-shaped resilient stud portion with the opposed legs of the U-shaped stud portion normally being spaced apart at the open end of the U, said U-shaped stud portion having the opposed legs with relatively broad rectangular cross sections, article engaging arms extending in opposite directions from the free ends of said U-shaped stud portion, and a pair of resilient oppositely disposed work piece engaging wings integrally connected along marginal portions thereof with marginal portions of said stud portion adjacent its closed end, each of said wings including portions of relatively broad rectangular cross section with the broad sides of said rectangular wing portions disposed substantially parallel to the broad sides of the legs of the U-shaped stud portion, said wings extending along and overlying opposite sides of said U-shaped stud portion, said wings also being integrally connected together adjacent the closed end of the U-shaped stud portion, and said wings having work piece engaging portions flared outwardly in the same directions as said arms.

3. A one piece sheet metal snap fastener for securing molding or the like to an apertured work piece, comprising a substantially U-shaped stud section, molding engaging and retaining arms extending in opposite directions from the free ends of said U-shaped stud section, a generally U-shaped resilient work piece engaging section having its closed end overlying and closely conforming with the closed end of said U-shaped stud section, said U-shaped sections being connected integrally along the marginal edges thereof adjacent their closed ends, said work piece engaging section having wings extending along the sides of said stud section, said wings having diverging cam portions terminating in coverging work piece engaging portions.

4. A one piece sheet meal fastener for securing articles to an apertured work piece, comprising a pair of reversely bent legs forming a stud section, article engaging and retaining arms extending in opposite directions from the free ends of the legs of the stud section, work piece engaging wings each having a marginal portion thereof integrally connected with a corresponding one of the legs of said stud section and each said wing being folded upon the associated leg of said stud section and in parallel relation thereto along the marginal connection therewith, and each said wing having an outwardly flared work engaging portion adjacent the free ends thereof.

References Cited in the file of this patent
UNITED STATES PATENTS

| Number | Name | Date |
|---|---|---|
| 2,180,925 | Dyresen | Nov. 21, 1939 |
| 2,223,622 | Kost | Dec. 3, 1940 |
| 2,246,720 | Churchill | June 24, 1941 |
| 2,295,449 | Churchill | Sept. 8, 1942 |
| 2,531,351 | Churchill | Nov. 2, 1950 |
| 2,594,211 | Poupitch | Apr. 22, 1952 |